United States Patent
Wu et al.

(10) Patent No.: US 7,225,177 B2
(45) Date of Patent: May 29, 2007

(54) GENERATING A KNOWLEDGE BASE

(75) Inventors: Yuh-Cherng Wu, San Jose, CA (US); Huiling Gong, Sunnyvale, CA (US)

(73) Assignee: SAP Aktiengesellschaft (DE)

( * ) Notice: Subject to any disclaimer, the term of this patent is extended or adjusted under 35 U.S.C. 154(b) by 338 days.

(21) Appl. No.: 10/782,576

(22) Filed: Feb. 19, 2004

(65) Prior Publication Data

US 2005/0197990 A1   Sep. 8, 2005

(51) Int. Cl.
*G06N 5/00* (2006.01)

(52) U.S. Cl. .............................. 706/48; 706/45; 706/50; 707/1; 707/2; 707/102

(58) Field of Classification Search ................. 706/12, 706/16, 45–51, 59, 61; 707/1, 2, 102
See application file for complete search history.

(56) References Cited

U.S. PATENT DOCUMENTS

| | | | |
|---|---|---|---|
| 4,930,071 A | 5/1990 | Tou et al. | |
| 5,233,513 A | 8/1993 | Doyle | |
| 5,386,498 A * | 1/1995 | Kakefuda ................... | 706/59 |
| 5,487,135 A | 1/1996 | Freeman | |
| 5,819,254 A * | 10/1998 | Kawai ........................... | 707/2 |
| 5,978,594 A | 11/1999 | Bonnell et al. | |
| 6,226,792 B1 | 5/2001 | Goiffon et al. | |
| 6,292,792 B1 | 9/2001 | Baffes et al. | |
| 6,470,227 B1 | 10/2002 | Rangachari et al. | |
| 6,526,387 B1 | 2/2003 | Ruffin et al. | |
| 6,574,621 B1 | 6/2003 | Lautzenheiser et al. | |
| 6,640,231 B1 * | 10/2003 | Andersen et al. ........... | 707/102 |
| 6,766,368 B1 | 7/2004 | Jakobson et al. | |
| 2003/0018616 A1 * | 1/2003 | Wilbanks et al. .............. | 707/2 |
| 2004/0122799 A1 * | 6/2004 | Goyal et al. .................... | 707/2 |

FOREIGN PATENT DOCUMENTS

EP   1209617   5/2002

OTHER PUBLICATIONS

Lesser et al., "BIG: An Agent for Resource-Bounded Information Gathering and Decision Making," *Artificial Intelligence*, 118 (2000) 197-244.

(Continued)

*Primary Examiner*—Joseph P Hirl
*Assistant Examiner*—Omar F. Fernández Rivas
(74) *Attorney, Agent, or Firm*—Fish & Richardson P.C.

(57) ABSTRACT

A method to automatically generate a new knowledge base includes receiving a signal that defines content that is to be included in the new knowledge base. Tables within an existing database are searched to identify at least one candidate table that is associated with data that may be relevant to the defined content that is to be included in the new knowledge base. At least one candidate application programming interface (API) is determined for each candidate table. Combinations of the identified at least one candidate table and the determined at least one candidate API are assessed to select from those combinations a master table and a master API for the new knowledge base. The new knowledge base is accessible by more than one application program within an integrated system. A non-expert user may automatically generate a new knowledge base and associated API with a single mouse click.

15 Claims, 9 Drawing Sheets

OTHER PUBLICATIONS

Gamma, et al. "Praise for Design Patterns: Elements of Reusable Object-Oriented Software", *Addison-Wesley*, Sep. 1999.

Islam, et al. "An Essential Design Pattern for Fault-Tolerant Distributed State Sharing", *Communications of the ACM*, Oct. 1996, vol. 39, No. 10, pp. 65-74.

Craven et al. "Learning to Construct Knowledge Bases From The World Wide Web," *Artificial Intelligence*, 2000, vol. 188, pp. 69-113.

Hacid et al. "A Database Approach for Modeling and Querying Video Data," *IEEE Transactions on Knowledge and Data Engineering*, Sep./Oct. 2000, vol. 12, No. 5, pp. 729-750.

J. Sukarno Mertoguno, "Distributed Knowledge-Base: Adaptive Multi-Agents Approach," *International Journal on Artificial Intelligence Tools*, 1998, vol. 7, No. 1, pp. 59-70.

McKay, "Kflow Knowledge Management: Built to Leverage the Way We Think", *CIRI Lab Inc.*, obtained from document undated, 6 pages.

"Generate Run-Time Diagnostic Knowledge Base Tools", *Giordano Automation*, obtained at document said to be last modified on Dec. 28, 2001, printed from the Internet on Nov. 6, 2003, 1 page.

"Generate Run-Time Diagnostic Knowledge Base", *Giordano Automation*, obtained at printed from the Internet on Nov. 6, 2003, 19 pages.

"E-Service with Advanced Workflow", *Q-Link Technologies*, obtained from printed from the Internet on Feb. 10, 2004, 2 pages.

"Business Process Modeling Language", obtained at printed from the Internet on Feb. 11, 2004, 1 page.

A. Arkin "Business Process Modeling Language (BPML)" 2000, obtained at 67 pages.

Screen shots of a Wizard Builder sold by SAP AG, 7 sheets.

* cited by examiner

GENERATING A KNOWLEDGE BASE

TECHNICAL FIELD

This invention relates to generating a knowledge base from existing data in an enterprise software system.

BACKGROUND

Knowledge management in enterprise software systems may include integrating frameworks that provide a bridge for a variety of application programs to access various data sources by using common services, e.g., search, text mining, data mining, and learning capabilities. Such a bridge, however, does not avoid the need to provide different application programs with flexible access to data in various formats and from various sources. For example, an enterprise software system already defines tens of thousands of data objects in various formats, and the number of defined objects continues to grow. Not only does this make maintaining full data accessibility challenging, it also places a significant burden on human experts and knowledge managers who must design and support the knowledge bases in enterprise systems. The growing complexity of these systems, and the scarcity of human resources to support them, imposes a high cost that significantly impairs the potential utility of knowledge bases.

In a knowledge base, data objects are organized to provide application programs with efficient access to information. To access (read from or write to) a knowledge base, an application program must typically communicate through an application programming interface (API) specific to that knowledge base. In effect, the API supplies the application program with metadata (format, data type, etc.) needed to reach the contents of the knowledge base. The API may comprise software code. For a human operator to generate an API that enables any application program in an enterprise system to access all available data objects normally requires the operator to possess in-depth understanding and knowledge about the data sources, and to expend considerable time and effort building and testing the API.

Moreover, generating a desired knowledge base from pre-existing data sources further burdens human experts and knowledge managers. In an enterprise system, experts who have in-depth knowledge about specific business objects can manually create a desired knowledge base from pre-existing knowledge bases. However, use of experts to manually create custom knowledge bases typically involves considerable time and expense. These burdens on limited expert resources limit a user's ability to create customized knowledge bases as needed.

SUMMARY

In one aspect, the invention features a method and a computer software product for generating a new knowledge base. The method includes receiving a signal that defines content that is to be included in the new knowledge base. Tables within an existing database are searched to identify at least one candidate table that is associated with data that may be relevant to the defined content that is to be included in the new knowledge base. At least one candidate application programming interface (API) is determined for each candidate table. Combinations of the identified at least one candidate table and the determined at least one candidate API are assessed to select from those combinations a master table and a master API for the new knowledge base. The new knowledge base that is accessible by more than one application program within an integrated system is then generated.

Implementations may include one or more of the following features. The new knowledge base may be generated in response to the received signal. The received signal may be generated by an application program within the integrated system. Selecting an icon on a display may trigger the received signal. The new knowledge base may be generated with a single click from within the application program. To determine at least one candidate API for each candidate table, at least one existing API may be selected to be one of the candidate APIs, or, alternatively, code may be generated to create one of the candidate APIs. The new knowledge base may also be tested to verify that the new knowledge base is accessible by more than one application program within the integrated system. The integrated system may be an enterprise system. The method may be run as a background process relative to the application program.

In some implementations, one or more heuristic rules may be applied to determine a score for each table and to select candidate tables from among tables that score above a threshold score. Similarly, the APIs may be assessed, and one or more heuristic rules may be applied to determine a score for each API and to select candidate APIs from among APIs that score above a threshold score. In such implementations, the heuristic rules may be adapted based on experience to optimize performance of subsequently generated new knowledge bases.

Certain implementations may have one or more of the following advantages. The new knowledge base may include objects that are relevant to the state of an application program at the time the user initiates the knowledge probe process. A non-expert user may automatically generate a desired new knowledge base with a single mouse click (or equivalent input signal to a computer). A further advantage to non-expert enterprise system users is that an API is automatically generated so that any application program in the enterprise system can access and use the newly created knowledge base. The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
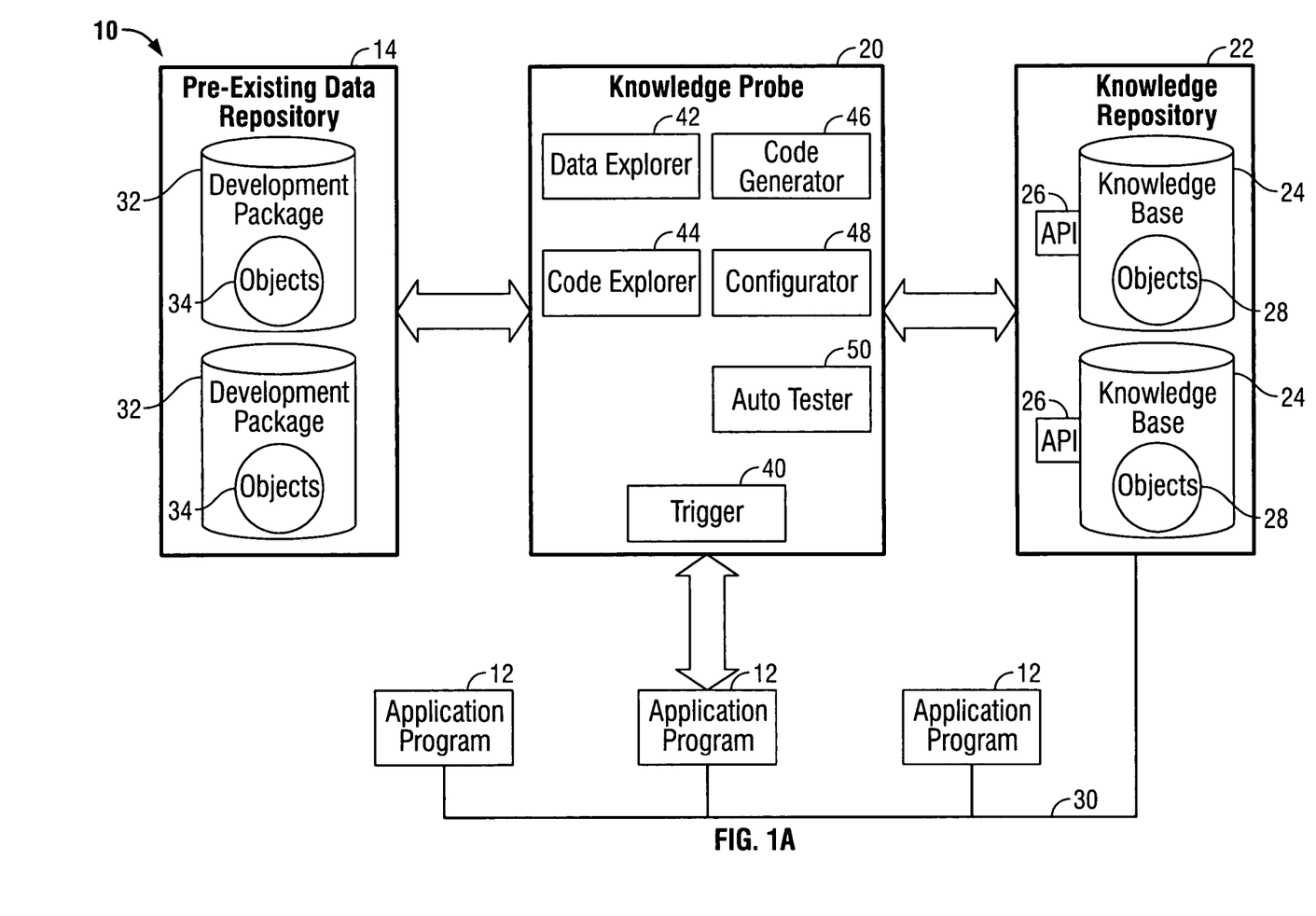
FIG. 1A is a functional block diagram of an information technology system that implements aspects of the invention.

An enterprise information technology system 10, shown in FIG. 1A, includes application programs 12 and a pre-existing data repository 14. When using one of the application programs 12, a system user may trigger a computer-implemented process, knowledge probe 20, to create within a knowledge repository 22 of system 10 a new knowledge base 24. To generate the new knowledge base 24, the knowledge probe 20 receives information about the current state of the application program 12, identifies information in the pre-existing data repository 14 that is relevant to that current state, and uses that information to generate the new knowledge base 24. The knowledge probe 20 also provides an application programming interface (API) 26 for the new knowledge base 24 so that any application program 12 in the enterprise system 10 can access data objects 28, which may also be called knowledge entities, contained in the new knowledge base 24 over a communication network 30.

To generate the new knowledge base 24, the knowledge probe 20 relies, at least in part, on the pre-existing data repository 14 having objects 34 that are relevant to the triggering application program 12. A user may trigger the knowledge probe 20 at any point while using the application program 12. Once triggered, the knowledge probe 20 may execute as a background process relative to the application program 12, thereby allowing a user to continue to use the application program 12 without interruption while the knowledge probe 20 generates the new knowledge base 24. If the application program 12 triggers the knowledge probe 20, the new knowledge base 24 may be successfully generated if the pre-existing data repository 14 contains the data objects 34 that are relevant to the application program 12. For the remainder of this document, the existence of data objects 34 that are relevant and stored in the pre-existing data repository 14 is presumed unless otherwise indicated.

Figure 1B:
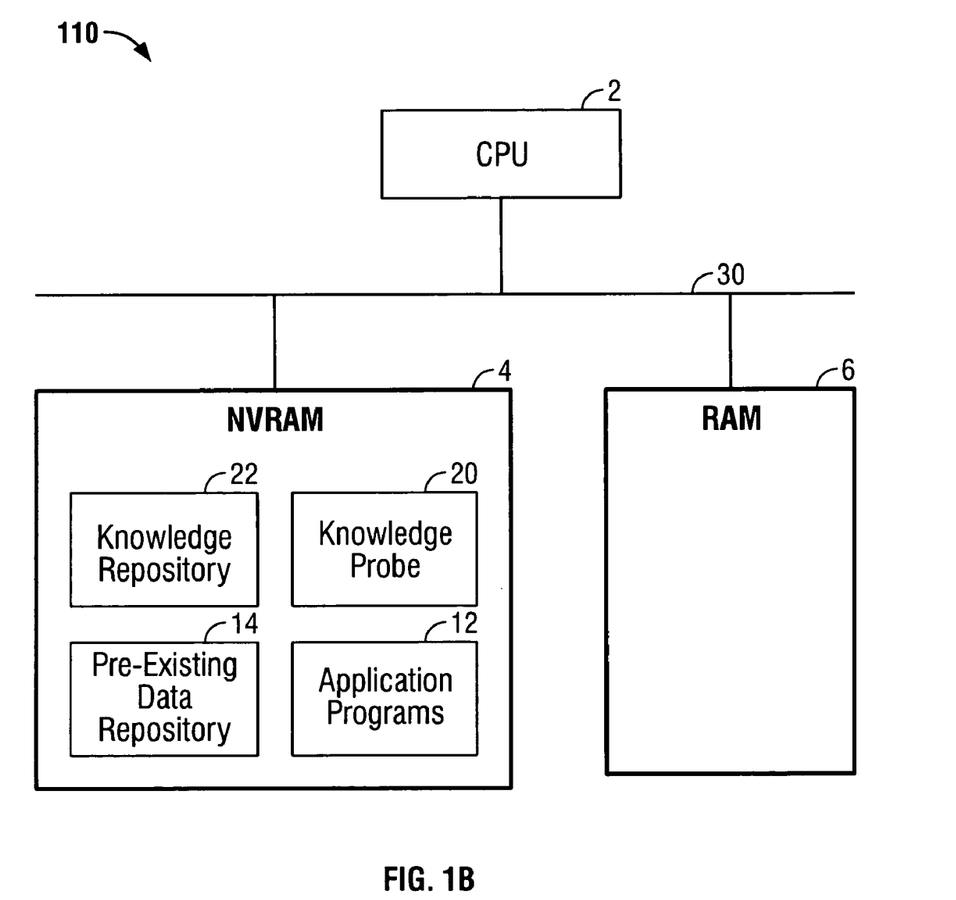
FIG. 1B is a block diagram of a computing system that includes some of the components shown in FIG. 1A.

FIG. 1B shows a block diagram of a physical system 110 that implements some of the functions shown in FIG. 1A. System 110 includes a central processing unit (CPU) 2, a non-volatile memory (NVRAM) storage unit 4, and a random access memory (RAM) 6, all of which can exchange information over the communication network 30. The CPU 2 generally includes a microprocessor, and any required supporting circuitry and operating system software, to execute program instructions. Program instructions may include, for example, code that defines the knowledge probe process 20 or code that defines one of the application programs 12. Program instructions are typically stored in the NVRAM 4, which may be located on, for example, hard disk drives, floppy disks, or electrically erasable programmable read-only memory (EEPROM), or their functional equivalents, to provide for retrieval under CPU control. The NVRAM 4 may store program instructions, such as the knowledge probe 20 and the application programs 12, and it may store data, such as the pre-existing data repository 14 and the knowledge repository 22. In operation, CPU 2 may cause data and program instructions to be copied from the NVRAM 4 to the RAM 6 over the communication network 30. Equivalent variations of the just described computer system architecture, which are well known in the art of computer system design, may be assembled to execute the knowledge probe 20 on the enterprise system 10.

With reference to both FIGS. 1A and 1B, the enterprise system 10 may be any computer system used for business applications. For example, the enterprise system 10 may be a customer relationship management (CRM) system having marketing, sales, and service software application programs. The application programs 12 may be any software application that is included in the enterprise system 10. The application programs 12 may be, for example, software for product ordering, service requests, and problem solution searching. When the user issues a command to generate a new knowledge base 24 for the application program 12, the knowledge probe 20 receives information from the application program 12 that defines the content of the knowledge base 24 to be created. The knowledge probe 20 uses this information to identify relevant data objects 34 from the pre-existing data repository 14. In connection with this content-defining information, the application program 12 may also generate a triggering signal; in response to receiving this signal, the knowledge probe 20 may generate the new knowledge base 24.

In a typical enterprise system 10, more than one application program 12 may be interconnected through the communication network 30. The communication network 30 may include one or more communication interfaces, protocols, and interconnections that are well known in the art of computer software systems for sharing information among multiple software programs.

The pre-existing data repository 14 includes one or more development packages 32 that contain data objects 34. Each development package 32 includes one or more database tables associated with the data objects 34. In some implementations, the development package may refer to SAP's commercially available "development package" that holds a collection of various programming objects, such as, for example, various programming modules and data objects.

The data objects 34 are objects that may be accessed (i.e., added, modified, or deleted) by the application programs 12. The data objects 34 contain information, for example, about specific products, individual customers, sale orders, and service contracts. Data objects may also refer, for example, to documents that may be accessed by the application programs 12 and, as such, documents are sometimes referred to as business objects.

The data objects 34 may be associated with one or more database tables. Database tables contain metadata that may define, for example, the format, content, or type of the associated data objects 34. The knowledge probe 20 may use the database tables to identify relevant data objects 34 from which to create the new knowledge base 24.

Referring to FIG. 1A, the knowledge probe 20 is a process that includes several distinct sub-processes: a triggering process 40, a data exploring process 42, a code exploring process 44, a code generating process 46, a configuration process 48, and an auto testing process 50. The triggering process 40 receives information about the current state of the application program 12 to initiate the knowledge probe 20 in order to create the new knowledge base 24. The data explorer process 42 explores the pre-existing data repository 14 to identify candidate data objects 34 that may be relevant to the state of the application program 12. The code exploring process 44 searches for existing API code that may be reused in an API 26 in the new knowledge base 24. The code generating process 46 generates code for the API 26 if the code exploring process 44 is unable to identify a suitable API in the pre-existing data repository 14. The configuration process 48 generates interface information that the application programs 12 may use to access the knowledge base objects 28 through the API 26. The auto testing process 50 tests and evaluates whether the new knowledge base 24 is accessible such that any of the application programs 12 can access the data objects 28.

Referring to FIGS. 1A and 1B, the knowledge repository 22 is a repository that contains the new knowledge bases 24 generated by the knowledge probe 20. The knowledge repository 22 may exist, for example, as data in the NVRAM 4, or some other equivalent medium for storing knowledge bases. The knowledge repository 22 includes a set of configuration and customizing tables whose entries will determine the characteristics of each knowledge base 24. For example, these configuration and customizing table include entries that may determine, for example, which database tables are associated to each knowledge base 24. Each knowledge base 24 includes an API 26. In one implementation, the API 26 may be SAP's BAdI. Whatever its form, the knowledge repository 22 receives a new knowledge base 24 each time the knowledge probe 20 successfully generates a new knowledge base 24. The knowledge repository 22 provides a generic framework to migrate, synchronize, and aggregate stored knowledge from multiple and distributed data sources for use by, for example, the application programs 12 of the enterprise system 10. Stored knowledge in the system 10 may be represented in the knowledge base 24. The structure of data objects 28 within the knowledge base 24 may vary, for example, from free-form text to hierarchy attributes, and these structures may be static or dynamic. The knowledge repository 22 may be configured to support any practical number of the knowledge bases 24.

In some implementations, the knowledge base 24 may include a collection of business objects mapped to business data that are meaningful in business processes. In one implementation, the knowledge base 24 may include data structures having pointers to collections of documents. For example, pointers may refer to electronic mail (e-mail messages), web pages, and business documents that may be searched and organized by enterprise application agents.

Each newly created knowledge base 24 includes an API 26 and data objects 28. The API 26 connects to the communication network 30 to allow the application programs 12 to access the knowledge probe 20. The API 26 provides a software interface that enables a wide variety of application programs 12 to access the knowledge base 24 and to retrieve, modify, or store the data objects 28. The data objects 28 include certain elements of the data objects 34 identified by knowledge probe 20 as relevant to the state of the application program 12 when the knowledge probe 20 was initiated.

The knowledge probe 20 receives information from the application program 12 that defines parameters that permit the knowledge probe 20 to determine which data objects 30 in the pre-existing data repository 14 are relevant. The parameters may be represented, for example, by the transaction code 52, which includes information about the state of application program 12 at the time the knowledge probe is triggered. In some systems, each drop-down menu selection may be mapped to a transaction code. The state of application program 12 is defined by elements such as screen elements (displayed objects), program elements, and any documents that may be displayed or otherwise associated with the state of program 12. In conjunction with receiving the transaction code 52, the knowledge probe may receive an input signal to the triggering process 40 (see FIG. 1A) from the application program 12 that initiates a knowledge probe 20.

In one implementation, the system 10 allows a user to view the source code of a program that is running, and then allows the user to trigger the knowledge probe 20 to create a knowledge base that relates to the program that is running. The knowledge probe 20 uses the transaction code 52 to build a new knowledge base that is relevant, or useful, to present and future users of that application program 12 when it is in the same state. The details of how the knowledge probe 20 selects the most relevant data will be described later. Briefly, for present purposes, the transaction code 52 defines what content the knowledge probe 20 is to put into the new knowledge base 24, and need not determine the format or structure of the new knowledge base 24 (though perhaps it may). The structural relationships and format of the data objects 28 in the new knowledge base 24 may be inherited from the structural relationships and format of the data objects 34 in the pre-existing data repository 14.

Figure 2:
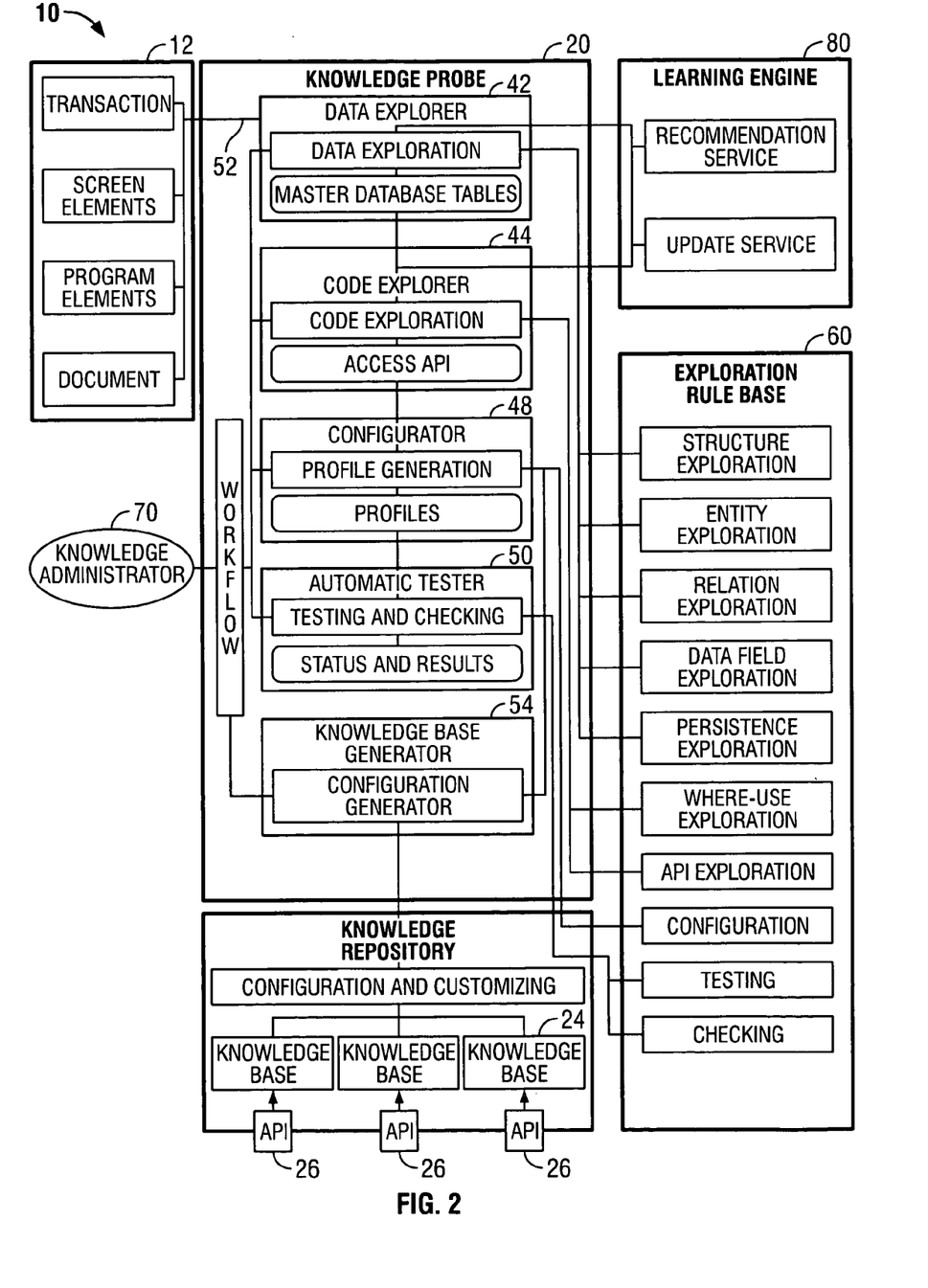
FIG. 2 is another block diagram of the system shown in FIG. 1A.

Referring to FIG. 2, one implementation of the knowledge probe 20 in the enterprise system 10 includes functional relationships between the application programs 12, the knowledge repository 22, an exploration rule base 60, a knowledge administrator workstation 70, and a learning engine 80. The knowledge probe 20 further includes the following processes: the data explorer 42; the code explorer 44; the configurator 48; the automatic tester 50; and a knowledge base generator 54.

In one implementation, the knowledge probe 20 begins when the user of an application program 12 initiates a knowledge probe process by, for example, manipulating a computer pointing device (e.g. a mouse) to select an icon associated with generating a new knowledge base. This user-initiated action causes the application program 12 to transmit a transaction code 52 that is received by the knowledge probe 20. The transaction code 52 defines the content of the new knowledge base 24 that the knowledge probe 20 is to create. As such, the transaction code 52 defines the parameters that the knowledge probe will use to identify and select data objects for the new knowledge base 24.

The transaction code 52 may be an electronic signal that represents the state of the application program 12 at the time the user initiates the knowledge probe 20. The state of the application program 12 includes, for example, information relevant to what is being displayed to the user on a user interface (i.e., a computer monitor) by the application program 12 at that moment the user initiates the knowledge probe 20 process. Information that is displayed by the application program 12 and that is relevant to the knowledge probe 20 process may include, for example, information associated with displayed input fields or displayed data, such as product categories, customer records, sales data, order information, warranty records, and the like.

In the implementation of FIG. 2, the knowledge probe 20 generates a new knowledge base 24 in response to receiving the transaction code 52 as follows. First, the data explorer 42 communicates with the exploration rule base 60 and the learning engine 80. The communication with the learning engine 80 permits the data explorer process 42 to adaptively improve its data exploration. The communication with the exploration rule base 60 provides the rule base with appropriate inputs (based on the transaction code 52) for each rule (each rule will be described later). In addition, this communication path returns results of the rule applications to the data explorer 42. Next, the data explorer 42 applies the rules from the exploration rule base 60 to database tables that are associated with the data objects 34 in the pre-existing data repository 14. The data explorer 42 scores the database tables according to their relevance to the transaction code 52. Then, the data explorer 42 ranks the scores to identify a candidate master database table that is most relevant to the transaction code 52. Alternatively, the data explorer 42 may use the scores to identify a number of candidate master database tables that score above a specified threshold.

A master database table is a database table that contains unique identifiers that may be used for a specific business process. For instance, a service order may contain two database tables, one that represents basic header information of a service order, and another one that represents service items associated with the service order. The parent database table has the service header with its unique identifier for each order, while the child database tables have multiple service items. The unique identifier links the child database tables to the service header. In this case, the service header database table is the master database table for service orders.

The code explorer 44 receives the candidate master database table (or tables) identified by the data explorer 42, and identifies one or more candidate APIs for each candidate master database table. The code explorer 44 applies rules from the exploration rule base 60 to evaluate the suitability of each candidate API to serve as an interface for the new knowledge base 24. A suitable API permits the application programs 12 to access the new knowledge base 24 over the communication network 30.

In an implementation, the code explorer 44 loads a set of "where-use" rules and API rules from the exploration rule base 60. The code explorer 44 generates "where-use" indexes by scanning a "where-use" of candidate master database tables, and recursively correcting "where-use" programming objects of all programming objects identified in a previous "where-use" check. After the scanning process, the "where-use" relationship between a master database table and programming objects can be cross-referenced. In one implementation, the code explorer 44 first searches for relationships between the master database table(s) and referenced programming objects. Furthermore, the "where-use" index may be extended to include cross-references among various pieces of programming objects.

In some enterprise systems 10, all required information about database tables and programming objects are stored in a database. In such systems, the code explorer 44 can automatically generate the "where-use" indexes among database tables, and various programming objects. In some enterprise systems 10, business objects are associated with a collection of database tables that relate to a specific business process. In these systems, the code explorer 44 can apply a rule to identify APIs associated with that collection of related databases.

If the code explorer 44 does not identify an API associated with the data object 34, then it will attempt to identify candidate APIs via other pre-defined API rules.

Because the enterprise system 10 may include a variety of programming environments and language syntaxes, the code explorer 44 may apply a variety of pre-defined API rules to identify potential API candidates for accessing the master database table. Different "where-use" rules may be required to efficiently identify the cross-references among database tables and programming objects in different programming environment and in different programming languages. For example, Java programming objects, or classes, can be cross-referenced using the header definition of each class.

There is no guarantee that the code explorer 44 will identify an optimal existing API. In one implementation, the code explorer 44 determines and selects an API from among sub-optimal candidate APIs based on some indication of the suitability of the potential candidates. The suitability can be gauged, at least in part, from the score obtained by each API from application of the rules provided by the exploration rule base 60. The score indicates the level of confidence that a candidate API can be used to access the master database table. In one implementation, candidate APIs that obtain a score above a threshold are selected for continued consideration, while other candidate APIs are dropped from further consideration. For example, if an API is believed to have 99% confidence that it can be used to access a master database table, then it will be selected for further consideration. In an alternative implementation, reports may be generated for consideration by a human knowledge engineer at the knowledge administrator workstation 70. The code explorer 44 passes all identified programming objects to the code generator 46.

If the code explorer 44 has identified an existing API to access the master database table, then the code generator 46 will generate codes to access the identified API via the knowledge repository 22. The code generator 46 creates code that provides access to the identified API and, if necessary, makes compatibility conversions (e.g., format, data) as necessary to support access from the network 30 to the knowledge base 24 through the API 26.

However, if the code explorer 44 does not identify an existing API to access the master database table, the code generator 46 will first generate a database access API that can access the database table. This newly created access API is a programming statement that replaces any existing API associated with that database table in the knowledge base that is being created. This generated access API can be used to generate the necessary code within framework of the knowledge repository 22. Thus, the code generator 46 generates codes that are necessary to communications over the network 30 between any application program 12 and the knowledge base 24.

In one implementation, the code generator 46 uses SAP's BAdI (Business Add-On Interface) tool, which is a general tool that permits custom programming to be referenced at particular points in an SAP system such that updates to the base system will be compatible with the custom code. The code generator 44 generates code into a BAdI implementation based on a pre-defined BAdI definition designed for the knowledge repository 22. For each BAdI generation, a set of programming methods is implemented. For example, a method to retrieve the detail of a knowledge entity 28 will call the identified API to retrieve the detail information from the master database table (or tables). Then the retrieved details will be converted into a standard data format that is pre-defined by the method.

The configurator 48 receives the candidate master database table(s) and candidate APIs and creates a configuration profile for each combination of candidate master database table/candidate API. The configurator 48 defines a set of configuration profiles for the new knowledge base 24 that are needed to properly interface the new knowledge base 24 with the communication network 30 and any application programs 12 connected thereto. Because of the uncertainty of identifying a single optimal access API, the configurator 48 may create more than one configuration profile. The configurator 48 applies rules from the exploration rule base 60 to determine a score for each configuration profile that it has created.

Each configuration profile is a collection of entries from a set of customizing tables whose values must be correctly entered by the configurator 48 in order to communicate successfully over the network 30. The configuration profile entries may include, for example, the name and description of the knowledge base, the association of the knowledge base to business applications and to search engines, the control of confidential information, and the associations between knowledge bases.

Previously, knowledge engineers or consultants could make such entries using, for example, a set of configuration/customization wizards. However, the knowledge probe 20 can make such entries automatically. In the knowledge probe 20, the configurator 48 can automatically make entries based on default values and information collected from previous processes. In an alternative implementation, the configurator 48 may create a workflow. Generally, a workflow represents a set of business actions, such as notification or approval, that enable a knowledge engineer to supervise the configurator 48, or to make a decision. In the event that the configurator 48 fails to complete a process automatically, a knowledge administrator may intervene to complete the process. In one implementation, the workflow automatically routes reports generated by the configurator 48 to the workstation 70 where the knowledge administrator can select the configuration profile to be used to generate the new knowledge base 24.

The automatic tester 50 receives the configuration profiles and loads rules from the exploration rule base 60. The automatic tester 50 uses the loaded rules to score configuration profiles according to their rate of successful performance. Then, the automatic tester 50 identifies a best performing configuration profile.

In an alternative implementation, a knowledge administrator at the workstation 70 may receive the best configuration profile identified by the automatic tester 50 and decide whether to accept the master database table and the API selected by the knowledge probe 20. Optionally, the knowledge administrator could forward the selected master database table and API to the knowledge base generator 54.

The knowledge base generator 54 receives the best configuration profile, which corresponds to the best candidate database table and associated best candidate API for use with that table. The knowledge base generator 54 includes a configuration generator process that generates the new knowledge base 24, including providing any required metadata and code for the API 26 as needed.

Exploration rules applied by sub-processes in the knowledge probe 20 are now described in further detail. The exploration rule base 60 includes rules for the data explorer 42, the code explorer 44, the configurator 48, and the automatic tester 50. In general, the exploration rule base 60 includes heuristic rules that may be applied to determine scores of merit for candidate master database tables and candidate APIs that the knowledge probe 20 uses to generate a new knowledge base 24. Using the exploration rule base 60, the knowledge probe 20 executes a rule-based method that is designed to explore relationships among database tables based on a set of rules using basic structured query language (SQL) properties. The rules can be defined and specified for different database management systems that include, for example, Sybase, Oracle, and Microsoft SQL. Once the rules are defined, the data explorer 42 and the code explorer 44 can explore the database relationships based on the set of given rules.

Many rules may be suitable for the data explorer 42 to evaluate and score the relevance of the data objects 34 in the pre-existing data repository 14. These rules may be implemented in various programming environments and languages. The basic rule types that may be included in the exploration rule base 60 may also be used in connection with processes other than the data explorer. Exemplary data explorer 42 rules are now described. Structural rules may retrieve all development packages 32 with parent-child relationships, or all development packages 32 with similar names. Entity rules may retrieve all table definitions defined under potentially relevant development packages, or all views defined under potentially relevant development packages. Relational rules may, for example, give higher ratings for tables identified as "transaction type" (i.e., table type indicating the content is used during a business transaction) and "master data type" (i.e., table type indicating the content is crucial as the master data resulted from a business transaction). Data field rules may retrieve all defined data elements for all potentially relevant tables, or all data fields to data elements mapping (i.e., a virtual metadata definition that allows a business meaning to be associated to a data field), or all data-elements-to-data-domain mappings (i.e., an actual data type definition for a data element, e.g., a data element A is defined as a data domain with 8 characters). Other implementations may include any of the following features: a globally unique identifiable key (a key that can be a unique identifier in a system); tables with a key defined as sequential number (a sequential number as a key that can be uniquely identified within the database table); persistence rule (e.g., tables with a defined enqueue/dequeue which will lock a database table to prevent two users make changes to the same record); and, tables defined for archiving purposes). Application of some or all rules like those just described permits the knowledge probe 20 to determine a score for database tables associated with certain data objects in the knowledge repository 14. Candidate master database tables are identified and selected by accumulating scores for each database table. Each candidate master database table may be ranked based upon the accumulated score.

Rules for the code explorer 44 include "where-use" rules and API rules. "Where-use" rules may, for example, provide higher scores for any of the following: parent programming objects at the upper levels of a "where-use" hierarchy; parent programming objects which try to read data from the database tables; and, parent programming objects in which data are read based on unique identifiable keys. API rules may, for example, provide higher scores for: parent programming objects which are business application programming interfaces (BAPIs); parent programming objects which are remote-enabled function modules; parent programming objects whose name contains "GET" or "DETAIL" (a standard naming convention to access data in SAP's "business object repository"); parent programming objects whose input parameters contain only the key defined in a database table. Candidate APIs for each candidate master database table are scored by accumulating scores from applying the API rules to each candidate API. Each candidate API may be ranked based upon the accumulated score.

Rules for configurator 48 may provide a higher score for a combination of candidate master database table/candidate API based on, for example, any of the following: creating an entry to define a knowledge base key; creating an entry to generate programs that can call identified candidate APIs to retrieve contents, i.e. the objects 28 of the knowledge base 24; and, creating an entry so that a knowledge service element of the enterprise system 10 can dynamically execute a structured query language (SQL) statement to retrieve a set of knowledge entities from the master database table. Each combination of candidate master database table/candidate API may be ranked based upon the accumulated score.

Rules for automatic tester 50 may provide a higher score to a configuration profile based on, for example, any of the following: testing whether a batch of knowledge entities (i.e. objects 28) can be retrieved from the knowledge base 24, and measuring the performance (i.e. computational cost which may be significant, e.g., when retrieving a set of sales orders from a database containing millions of records) of that retrieval; testing whether details of a knowledge entity can be retrieved, and measuring the performance of that retrieval; and, testing whether data can be compiled into a searchable index. Each configuration profile may be ranked based upon the accumulated score.

The knowledge administrator at the workstation 70 may provide for optional human intervention to supplement the computer-implemented processes of knowledge probe 20.

As described elsewhere, the knowledge administrator may or may not be used to approve, for example, a final configuration profile for configurator 48. In addition to providing an alternative approval mechanism, the knowledge administrator may also receive reports and status information from the knowledge probe 20 for informational purposes. It is not necessary that the knowledge administrator is present to use the knowledge probe 20; nevertheless, it remains an option. A typical knowledge administrator would have expertise about the pre-existing data repository 14, development packages 32, or data objects 34, that a non-expert user of the application programs 12 would not require to generate a new knowledge base 24 using the knowledge probe 20.

The learning engine 80 includes processes that may employ, for example, recursive feedback techniques to adaptively improve the algorithms used in the data explorer 42 and the code explorer 44. The learning engine 80 may take past experience into account to determine corrections that may optionally be applied to the explorer processes 42 and 44. For example, the learning engine 80 may adjust the above-described specified thresholds used by the data explorer 42 to identify candidate master database tables. Specifically, if the knowledge probe 20 is identifying too few candidate tables, then the learning engine 80 may reduce the threshold score so that more candidate database tables may score above the specified threshold.

Figure 3:
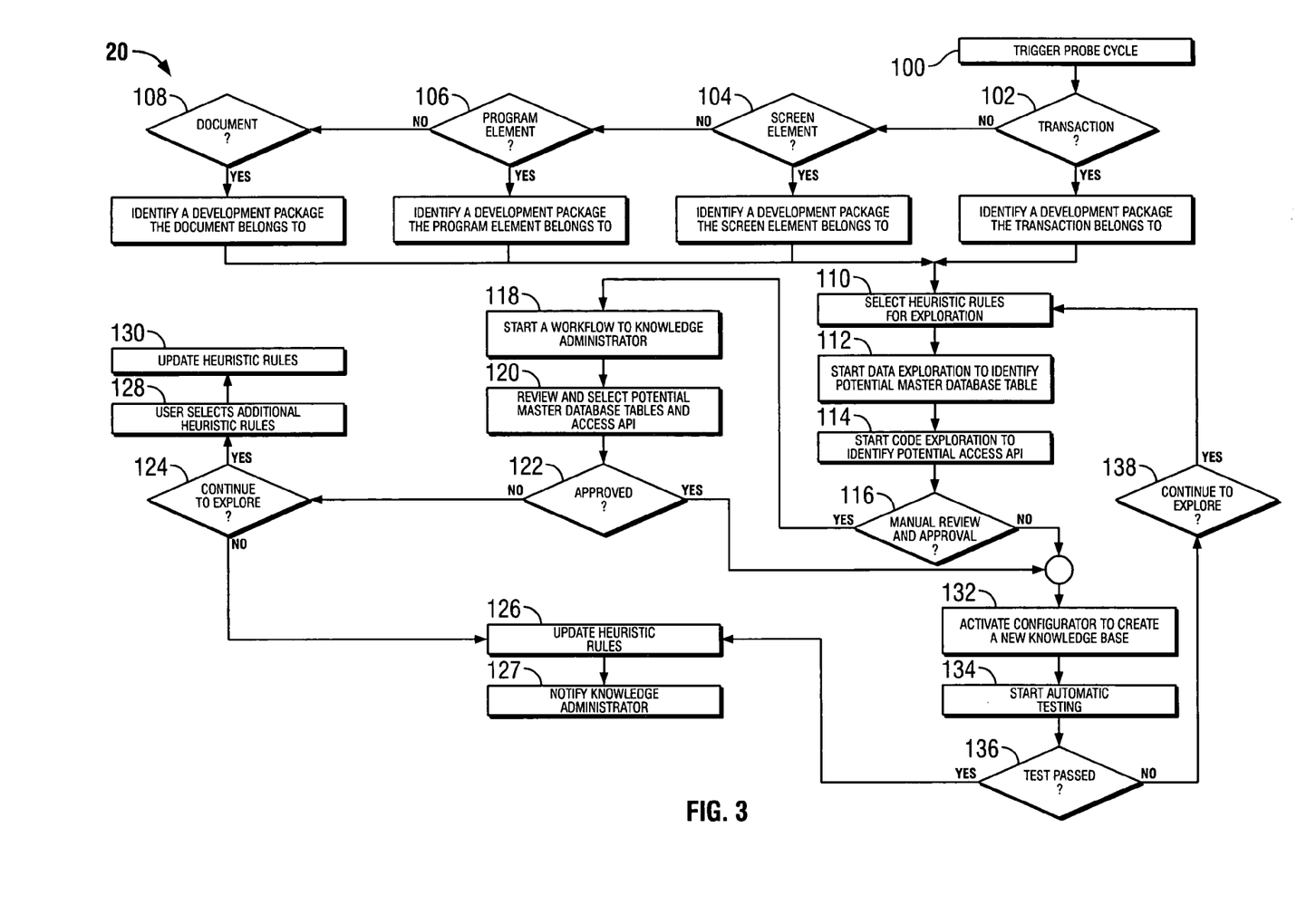
FIGS. 3-8 are flow diagrams of methods that may be executed in the system shown in FIG. 1A.

FIG. 3 shows an overall program flow control diagram that represents the logical steps that the knowledge probe executes, in one implementation, when creating a new knowledge base 24. The initial step begins the knowledge probe 20 receiving a trigger probe cycle signal at 100 from the application program 12, and concludes with an optional notification to the knowledge administrator at the workstation 70 that the knowledge probe 20 has successfully generated a new knowledge base 24. The user may be able to trigger a probe cycle with as little as a single action, which could constitute, for example, a single mouse click on an icon or on a menu item in a drop-down pick list at any time while running the application program 12.

Once triggered, the knowledge probe 20 checks the state of the application program to start the data explorer 42 process. In one implementation, the knowledge probe 20 determines the state of the application program 12 in preparation for locating data objects and codes that are relevant to the application program 12. Once the state of the application program 12 is determined, the knowledge probe 20 explores the pre-existing data repository 14 to locate objects that have some relationship to the application program 12. The state of the application program 12 is determined by determining, for example, transaction codes at 102, screen elements, program elements, or documents associated with the application program 12 at the time the knowledge probe is triggered.

In one implementation, the knowledge probe 20 may be triggered by a transaction code at 102. The running application program 12 and associated development package 32 that holds the relevant programming objects and data objects 34 then can be identified by checking a system table that associates the development package 32 with the transaction code. Some enterprise systems 10 further define and associate every screen element with data structures in a development package 32. If transaction code information is not available in such systems, the knowledge probe 20 can explore possible relationships between screen elements and development packages 32 at 104. In other implementations, the knowledge probe 20 may explore system tables to identify associations between a running application program 12 and the development package 32 at 106, or between documents and the development package 32 at 108.

Having identified one or more development packages 32, the knowledge probe 20 next selects heuristic rules for exploration at 110. Then, it activates the data explorer 42 to identify a candidate master database table at 112. After identifying at least one candidate master database table, it activates the code explorer 44 to identify the candidate APIs for use with the candidate master database tables at 114.

If the knowledge probe 20 is configured to require manual review and approval of the identified candidate master database tables and the candidate APIs at 116, then the knowledge probe 20 may activate a workflow to the knowledge administrator at 118. The knowledge administrator may review and select at 120 from among the candidate master database tables and the candidate APIs proposed by the knowledge probe 20, and, at 122, may either approve or disapprove of further action to generate the new knowledge base 20. If disapproved, the knowledge probe may continue to explore for solutions at 124, and the heuristic rules of the exploration rule base 60 may be modified and updated at 126. Optionally, the knowledge probe 20 may notify the knowledge administrator at 127. If approved, it can cease exploration, allow the user to select additional heuristic rules at 128, and update the heuristic rules at 130.

If the knowledge administrator approves the identified candidate master database tables and the candidate APIs at 122, or if the knowledge probe 20 is not configured to seek review and approval from the knowledge administrator at 116, then the next step is to activate the configurator 48 to create a new knowledge base at 132. Next, automatic testing is applied to the new knowledge base at 134. If the proposed new knowledge base passes the test at 136, then the knowledge probe 20 may update heuristic rules at 126 in the exploration rule base 60, and may optionally notify the knowledge administrator at 127. If it fails the test at 136, then it continues to explore at 138 and loops back to the step of selecting heuristic rules for exploration at 110.

FIGS. 4-8 show additional detail about the operation of the following sub-processes of the knowledge probe 20: the data explorer 42, the code explorer 44, the configurator 48, the automatic tester 50, and the code generator 46.

Figure 4:
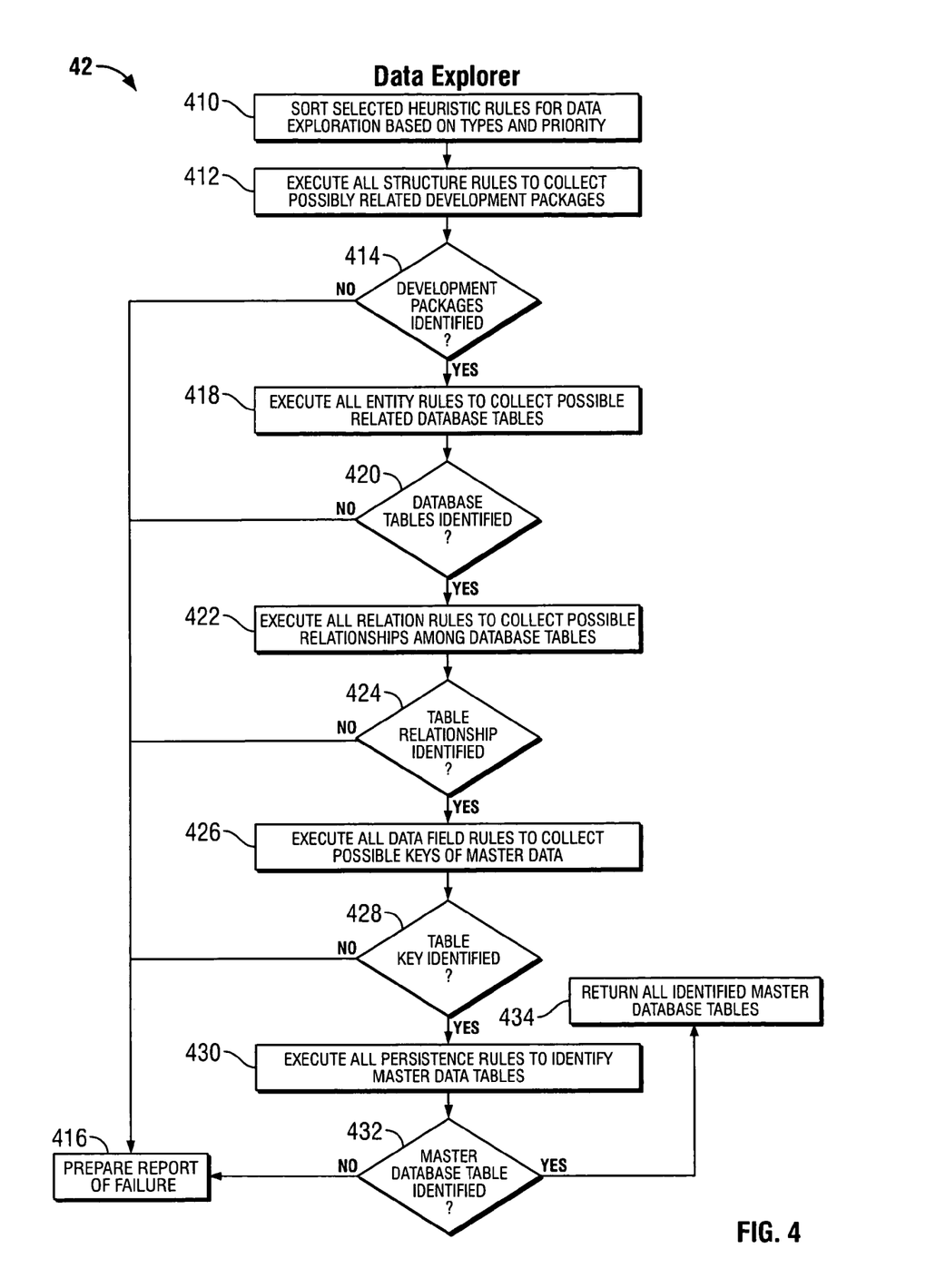

FIG. 4 shows, in one implementation, a program flow control diagram that represents the logic executed when the data explorer 42 is activated. The elements of FIG. 4 generally correspond to elements 110 and 112 of FIG. 3. Referring to FIG. 4, the data explorer 42 sorts selected heuristic rules for data exploration received from the exploration rule base 60 based on types and priority. Priority may be important in some implementations because the sequence in which the rules are applied can affect performance by reducing the number of items in the pre-existing data repository 14 that must be checked. After sorting the received rules at 410, the data explorer 42 executes all structural rules at 412 to locate possibly associated development packages 32. After possibly associated development packages 32 have been located, then those development packages 32 may be exhaustively explored. If the data explorer 42 does not identify any possibly related development packages at 414, the failure condition activates at 416, whereby the knowledge probe 20 will not continue to generate the new knowledge base, and it may optionally generate a failure report. On the other hand, if it does identify a relevant development package 32, it next executes all entity rules at 418 in order to collect possibly related database tables whose contents are potential candidates to form the new knowledge base. Again, if it does not identify any possibly related database tables at 420, then the failure condition activates at 416. However, if it identifies any database tables at 420, then it next executes all relation rules to collects possible relationships among database tables at 422. Again, if it identifies no database table relationships, then the failure condition activates at 416. However, if it identifies any possible relationships among database tables at 424, then it executes all data field rules to collect possible keys of master data at 426. The key information is important because a key can provide crucial clues to identify a potential API candidate. In order for an existing API to access data, such as, for example, a service order, a uniquely identifiable key, or a unique service order ID, is sometimes necessary to retrieve the correct database record efficiently. Again, if it identifies no possible master data keys at 428, then the failure condition activates at 416. However, if it identifies any possible master data keys at 428, then it executes all persistence rules to identify master data tables at 430. Once more, if it identifies no master data tables at 432, then the failure condition activates at 416. However, if it identifies any candidate master database tables at 432, then it returns those tables at 434 to the next process, the code explorer 44.

Figure 5:
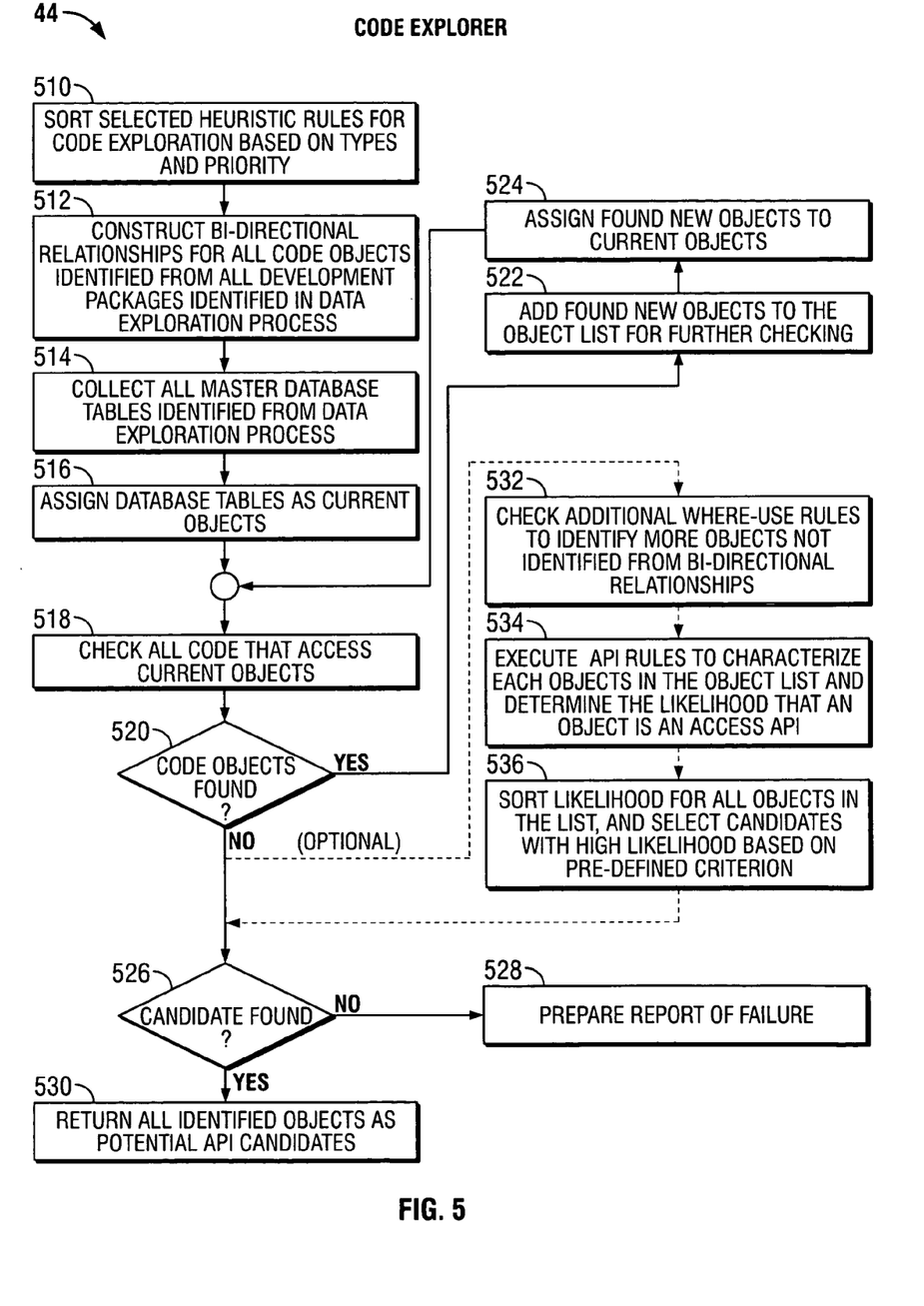

FIG. 5 shows, in one implementation, a program flow control diagram that represents the logic executed when the code explorer 44 is activated, and corresponds generally to the element 114 of FIG. 3. The code explorer 44 receives from the exploration rule base 60 selected heuristic rules for code exploration based on types and priority, and it receives from data explorer 42 candidate master database tables. Similar to the element 410 of FIG. 4 with relation to the data explorer 42, the code explorer 44 first sorts the selected heuristic rules for code exploration based on types and sequence at 510, and then it constructs bi-directional relationships at 512. These bi-directional relationships provide cross-reference among the programming objects describing which object is referenced by which objects for all code objects identified from all development packages 32 located by the data explorer 42. In some implementations, creating the bi-directional relationships among programming objects usually requires exhaustive searches for all codes. However, some implementations do not require exhaustive searching to the extent that these bi-directional relationships are already available in an enterprise system 10. Then, it collects all candidate master database tables identified by the data explorer 42 at 514, and assigns these database tables to a list of current objects at 516.

Next, the code explorer 44 checks each API code object at 518 to determine whether it can access any of the database tables in the list of current objects. If it finds a code object that can access a current object, then it adds that code object to the candidate list at 522. The newly found code objects are prepared for further checking, and then assigned to the list of current objects at 524. The checking process repeats until all available code objects have been checked. Then, it decides, based on the scores computed from the heuristic rules, whether it has found a code object that is a most likely candidate API at 526, e.g., a functioning API for use with a candidate master database table. If none has been found, it may generate a failure report at 528. Otherwise, the code explorer 44 concludes by returning any candidate APIs at 530 to the configurator 48.

Optionally, at the point at which all available code objects have been checked (the program flow is from element 520 to element 526), the decision about whether the code explorer 44 has found a candidate may be preceded by additional steps that may identify additional code objects as candidate APIs. In the first additional step, the code explorer 44 checks additional "where-use" rules at 532 to identify more objects not identified from bi-directional relationships. Then, it executes API rules at 534 to characterize each object in the object list and determines the likelihood that an object is an API. Finally, it sorts the likelihood for all objects in the list, and selects candidates at 536 that have a high likelihood of being an API for the new knowledge base 24 to access a knowledge entity 28 based on pre-defined criterion, e.g., a threshold that an API candidate is selected if it has a likelihood score higher than 0.8.

Figure 6:
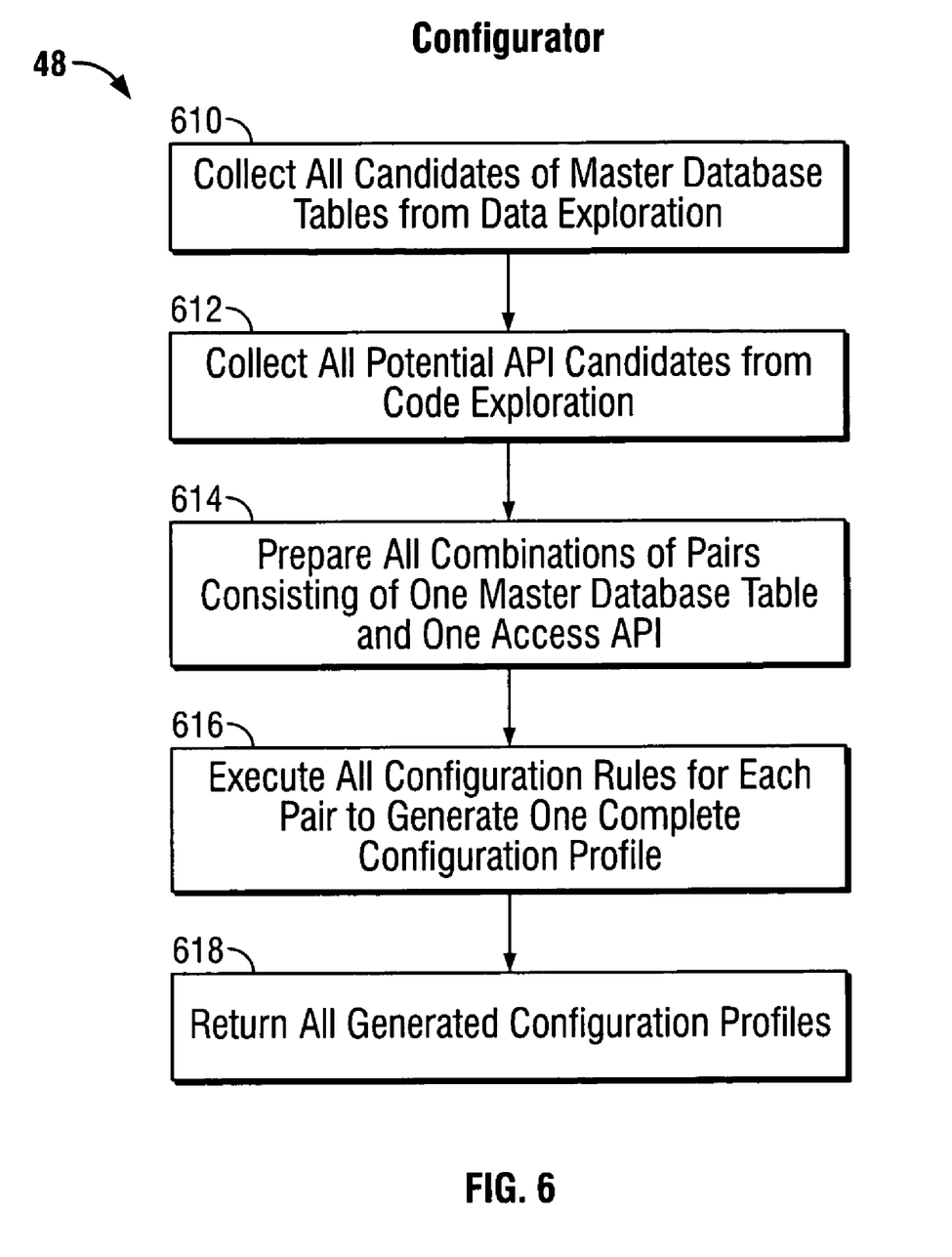

FIG. 6 shows, in one implementation, a program flow control diagram that represents the logic executed when the configurator 48 is activated, and corresponds generally to the element 132 of FIG. 3. First, the configurator 48 collects all candidate master database tables from the data explorer 42 at 610, and collects all candidate APIs from the code explorer 44 at 612. Then, it prepares all combinations of pairs of one master database table with one API at 614. Next, it executes all configuration rules from the exploration rule base 60 to generate a complete configuration profile for each combination at 616. Finally, the configurator 48 concludes by returning the generated profiles at 618 to the automatic tester 50.

Figure 7:
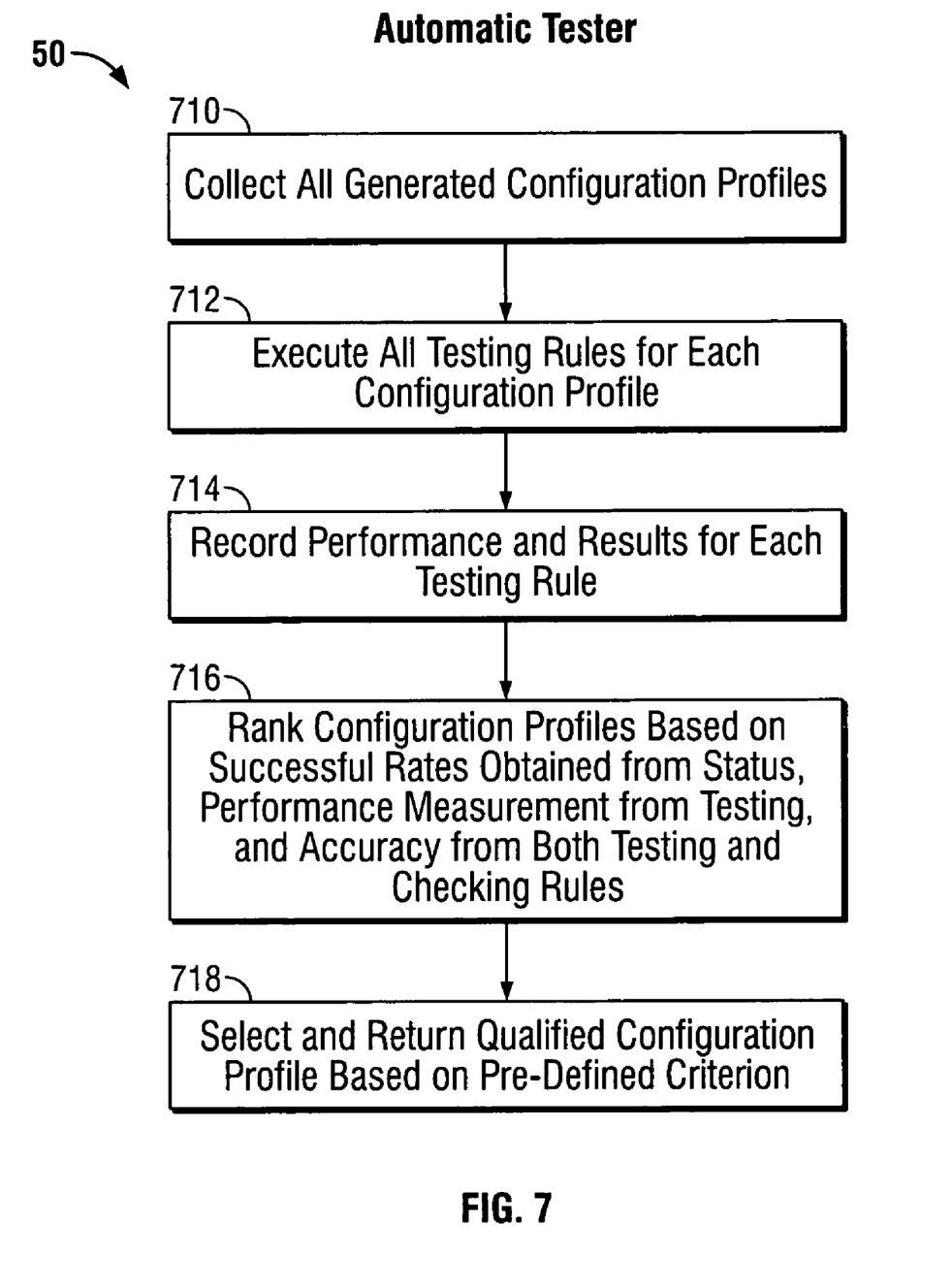

FIG. 7 shows, in one implementation, a program flow control diagram that represents the logic executed when the automatic tester 50 is activated, and corresponds generally to the element 134 of FIG. 3. First, the automatic tester 50 collects from configurator 48 all generated configuration profiles at 710. Then, it executes at 712 all testing rules and checking rules from the exploration rule base 60 for each configuration profile. Next, it records performance and results for each tested rule at 714. Then, it ranks successful configurations based on success rates obtained from the status, performance measurement, and accuracy from both testing and checking rules at 716. Finally, the automatic tester 50 concludes by selecting a most qualified configuration profile and returning the qualified configuration profile at 718 to the knowledge probe 20.

Figure 8:
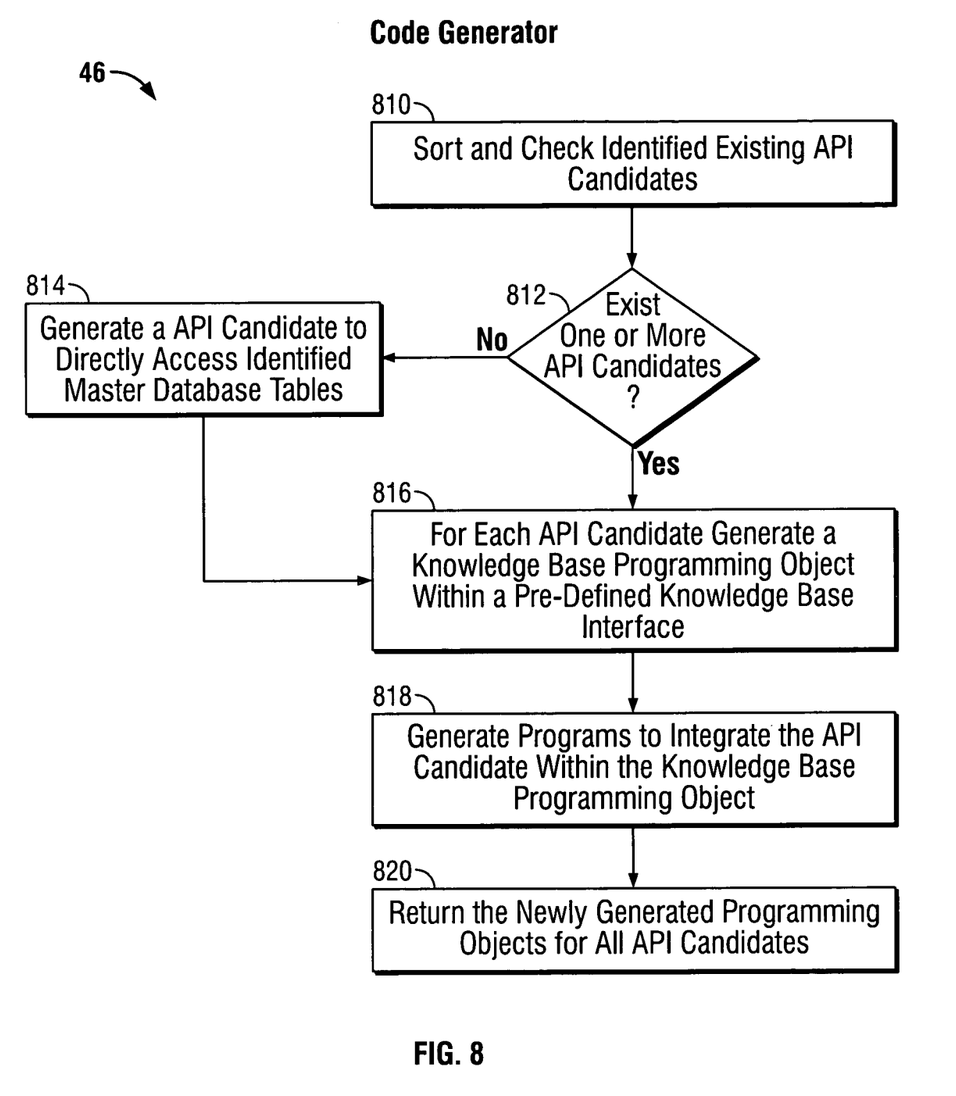

FIG. 8 shows, in one implementation, a program flow control diagram that represents the logic executed when the code generator 46 is activated. First, the code generator 46 sorts and checks at 810 existing APIs that have been identified by the code explorer 44. Next, if no API candidates exist at 812, then the code generator 46 generates an API candidate at 814 to directly access the master database tables that have been identified by the data explorer 42. Either after the code generator 46 generates an API candidate at 814, or if the code generator determines that one or more API candidates do exist at 812, then the code generator 46 next generates a knowledge base programming object at 816 for each API candidate. The code generator 46 generates the programming object within a pre-defined knowledge base interface. Then, the code generator 46 generates programs at 818 to integrate the candidate API with the newly generated knowledge base programming object. Finally, the code generator 46 concludes by returning to the knowledge probe 20 the newly generated programming objects for each of the API candidates at 820.

A number of embodiments of the invention have been described. Nevertheless, it will be understood that various modifications may be made without departing from the spirit and scope of the knowledge probe 20. For example, enterprise system 10 may be a CRM system. In such a CRM system, application programs 12 may include software to perform, for example, any or all of the following business processes: service orders; service contracts; complaints; business partners; opportunities; leads; installed bases; products; sales orders. As such, knowledge probe 20 may generate knowledge bases to contain a wide range of formats and types of data objects. Knowledge probe may involve a human knowledge administrator, who approves certain selection decisions made by the knowledge probe, or the knowledge probe may be fully automatic—i.e. no human intervention after the user triggers a knowledge probe with a single mouse click in an application program. Moreover, the knowledge probe may automatically learn to improve its own performance using adaptive learning techniques.

In various implementations, a knowledge probe can be generalized to any enterprise system, or any business application system by introducing, for example, a rule-based learning engine, a pattern recognizer, a code library, a configuration script library, or an automatic testing script library. This new method of the automated knowledge probe can be applied to any enterprise resource planning (ERP) system in which business processes are embedded inside large amounts of database tables, and complex relationships exist between the tables.

In the context of the knowledge probe API, "access" includes both "reading from" and "writing to" operations. For example, one application program 12 may create a particular knowledge base 24 and an API 26 for use with that knowledge base, and a second application program 12 may be able to read data in that new knowledge base 24 through the API 26. Moreover, a third application 12 may access the new knowledge base 24 through the API 26 by both reading and writing (and potentially erasing) information stored in the new knowledge base 24. Because the knowledge probe creates an API such that any application program 12 in the enterprise system 10 may access data objects 28 in the knowledge base 24, more than one application may potentially update the data objects 28 by adding, modifying, or deleting individual data objects. Of course, it is not required that every application program 12 in an enterprise system 10 be able to productively use all information in a particular knowledge base, such as when the knowledge base 24 contains information that is not relevant to the application program's 12 function.

The knowledge probe and associated apparatus and methods can be implemented in a computer program product tangibly embodied in an information carrier, e.g., in a machine-readable storage device or in a propagated signal, for execution by a programmable processor. Accordingly, other implementations are within the scope of the following claims.

What is claimed is:

1. A method for generating a new knowledge base, the method comprising:
   receiving a signal that defines content to be included in the new knowledge base;
   searching for tables within an existing database and identifying at least one candidate table that is associated with data that may be relevant to the defined content to be included in the new knowledge base;
   determining at least one candidate application programming interface (API) for each candidate table;
   scoring combinations of the identified at least one candidate table and the determined at least one candidate API;
   generating a master table and a master API for the new knowledge base, the master table and master API being generated automatically and based upon scores of the scored combinations; and
   generating the new knowledge base that is accessible by more than one application program within an integrated system.

2. The method of claim 1, wherein the received signal is generated by an application program within the integrated system.

3. The method of claim 1, wherein the new knowledge base is generated in response to the received signal.

4. The method of claim 1, wherein searching for tables within an existing database and identifying at least one candidate table that is associated with data that may be relevant to content to be included in the new knowledge base comprises: applying one or more heuristic rules to determine a score for each table and selecting candidate tables from among tables that score above a threshold score.

5. The method of claim 4, further comprising adapting the heuristic rules based on experience to optimize performance of subsequently generated new knowledge bases.

6. The method of claim 1, wherein determining at least one candidate API for each candidate table comprises: assessing APIs and applying one or more heuristic rules to determine a score for each API and selecting candidate APIs from among APIs that score above a threshold score.

7. The method of claim 6, further comprising adapting the heuristic rules based on experience to optimize performance of subsequently generated new knowledge bases.

8. The method of claim 1, wherein determining at least one candidate application programming interface (API) for each candidate table comprises: selecting at least one existing API to be one of the candidate APIs.

9. The method of claim 1, wherein determining at least one candidate application programming interface (API) for each candidate table comprises: generating code to create one of the candidate APIs.

10. The method of claim 1, further comprising testing the new knowledge base to verify that the new knowledge base is accessible by more than one application program within the integrated system.

11. The method of claim 1, wherein the method runs as a background process relative to the application program.

12. The method of claim 1, further comprising generating the new knowledge base with a single click from within the application program.

13. The method of claim 1, further comprising selecting an icon on a display to trigger the received signal.

14. The method of claim 1, wherein the integrated system comprises an enterprise system.

15. A computer program product tangibly embodied in an information carrier and containing therein instructions that, when executed, cause a processor to:
   receive a signal that defines content to be included in a new knowledge base that is to be generated;
   search for tables within an existing database and identify at least one candidate table that is associated with data that may be relevant to the defined content to be included in the new knowledge base;
   determine at least one candidate application programming interface (API) for each candidate table;
   score combinations of the identified at least one candidate table and the determined at least one candidate API;
   generate a master table and a master API for the new knowledge base, the master table and master API being generated automatically and based upon scores of the scored combinations; and
   generate the new knowledge base that is accessible by more than one application program within an integrated system.

* * * * *